United States Patent
Rao et al.

(10) Patent No.: US 11,644,390 B2
(45) Date of Patent: May 9, 2023

(54) CONTEXTUAL DATA MODELING AND DYNAMIC PROCESS INTERVENTION FOR INDUSTRIAL PLANTS

(71) Applicant: Buckman Laboratories International, Inc., Memphis, TN (US)

(72) Inventors: Narasimha M. Rao, Collierville, TN (US); Arun Kumar Raju Ganesan, Germantown, TN (US); John Carter, Mobile, AL (US)

(73) Assignee: Buckman Laboratories International, Inc., Memphis, TN (US)

( * ) Notice: Subject to any disclaimer, the term of this patent is extended or adjusted under 35 U.S.C. 154(b) by 90 days.

(21) Appl. No.: 17/243,430

(22) Filed: Apr. 28, 2021

(65) Prior Publication Data

US 2021/0333172 A1 Oct. 28, 2021

Related U.S. Application Data

(60) Provisional application No. 63/016,924, filed on Apr. 28, 2020.

(51) Int. Cl.
*G06F 11/30* (2006.01)
*G01M 99/00* (2011.01)
(Continued)

(52) U.S. Cl.
CPC ......... *G01M 99/005* (2013.01); *G06F 3/0481* (2013.01); *G06F 3/04842* (2013.01);
(Continued)

(58) Field of Classification Search
CPC ..... G06F 16/28; G06F 16/284; G01M 99/055
See application file for complete search history.

(56) References Cited

U.S. PATENT DOCUMENTS 7,092,897 B2 8/2006 Wallace
7,212,976 B2 5/2007 Scheer
(Continued)

FOREIGN PATENT DOCUMENTS

| EP | 2293164 A1 | 3/2011 |
| EP | 2469466 A1 | 6/2012 |
| KR | 101433724 B1 | 8/2014 |

OTHER PUBLICATIONS

Search Report and Written Opinion for corresponding International patent application PCT/US2021/029402, dated Aug. 18, 2021, 10 pages.

*Primary Examiner* — Phuong Huynh
(74) *Attorney, Agent, or Firm* — Patterson Intellectual Property Law P.C.; Gary L. Montle

(57) ABSTRACT

Systems and methods are disclosed herein for contextual data analysis and proactive intervention in industrial plant processes. Each of multiple data streams in an industrial plant are mapped to a common hierarchical data structure, wherein the data streams correspond to respective values or states associated with unit operations, assets, and process streams in the plant. The mapped data streams define hierarchical process relationships between subsets of the unit operations, assets, and process streams. Real-time data is collected to populate at least one level of the hierarchical data structure for certain data streams, wherein future outcomes are predicted for downstream operations based on the collected real-time data for at least one data stream, and at least one other data stream having a defined hierarchical process relationship therewith. Upon ascertaining that predicted future outcomes correspond to issues requiring intervention, output signals are generated based thereon for operator alerts and/or automated control.

16 Claims, 3 Drawing Sheets

(51) Int. Cl.
    *G08B 7/06*     (2006.01)
    *G06F 40/166*     (2020.01)
    *G06F 3/0481*     (2022.01)
    *G06F 3/04842*     (2022.01)
    *G06F 16/28*     (2019.01)
    *G06F 40/137*     (2020.01)

(52) U.S. Cl.
    CPC ............ *G06F 16/28* (2019.01); *G06F 16/284* (2019.01); *G06F 40/137* (2020.01); *G06F 40/166* (2020.01); *G08B 7/06* (2013.01)

(56) References Cited

U.S. PATENT DOCUMENTS

| | | |
|---|---|---|
| 7,715,929 B2 | 5/2010 | Skourup et al. |
| 7,817,150 B2 | 10/2010 | Reichard et al. |
| 8,700,499 B2 | 4/2014 | Laughlin et al. |
| 9,477,936 B2 | 10/2016 | Lawson et al. |
| 9,529,348 B2 | 12/2016 | Kephart et al. |
| 9,697,170 B2 | 7/2017 | Nixon et al. |
| 9,823,626 B2 | 11/2017 | Zornio et al. |
| 10,168,691 B2 | 1/2019 | Zornio et al. |
| 10,386,827 B2 | 8/2019 | Enver et al. |
| 10,496,061 B2 | 12/2019 | Strohmenger et al. |
| 2004/0098148 A1 | 5/2004 | Retlich et al. |
| 2004/0139085 A1 | 7/2004 | Eryurek et al. |
| 2005/0066241 A1 | 3/2005 | Gross et al. |
| 2009/0319058 A1 | 12/2009 | Rovaglio et al. |
| 2010/0256795 A1 | 10/2010 | Mclaughlin et al. |
| 2010/0257227 A1 | 10/2010 | Mclaughlin et al. |
| 2010/0257228 A1 | 10/2010 | Staggs et al. |
| 2012/0251996 A1 | 10/2012 | Jung et al. |
| 2014/0336788 A1 | 11/2014 | Paunonen et al. |
| 2014/0344117 A1 | 11/2014 | Brannon et al. |
| 2015/0276208 A1 | 10/2015 | Maturana et al. |
| 2017/0308802 A1 | 10/2017 | Ramsoy et al. |
| 2017/0357240 A1 | 12/2017 | Stewart et al. |
| 2018/0144271 A1 | 5/2018 | Schlitt et al. |
| 2020/0012265 A1* | 1/2020 | Thomsen ............... G06F 3/0481 |

* cited by examiner

CONTEXTUAL DATA MODELING AND DYNAMIC PROCESS INTERVENTION FOR INDUSTRIAL PLANTS

CROSS-REFERENCES TO RELATED APPLICATIONS

This application claims benefit of U.S. Provisional Patent Application No. 63/016,924, filed Apr. 28, 2020, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to process control for industrial plants and equivalent facilities. More particularly, an embodiment of an invention as disclosed herein relates to a cloud-based solution for implementing contextual modeling and data analysis to proactively predict, and automatically respond to, issues that arise during an industrial process.

One exemplary problem arising from conventional analysis of data from industrial plants is that, even though massive amounts of data may be collected and even meaningful for the user who collected the data, the usefulness of data very quickly dissipates when one moves further away from the point of data collection. The remote user looking at the data does not understand the context of the data without further explanation. Neither the data collector nor the remote user in conventional data analysis will be aware of how one piece of data connects to another piece of data elsewhere in the plant. Likewise, the data without a contextual framework cannot be easily compared to other data points outside of the respective plant. Some of the advanced calculations that can use the data to generate unique insights are impossible because all of the data pieces do not share the same framework and context. In short, the real value of data collected today is far short of what it could be if it had the right context and framework.

BRIEF SUMMARY

Generally stated, systems and methods as disclosed herein may enable users to collect and organize data about industrial customers in a structured, visual way. The invention allows allocation of unambiguous context to every piece of data, potentially establishing relationships with every other piece of data in the plant. The value of each piece of data is enhanced significantly as a result of these contextual connections, enabling the development of insights that are otherwise impossible using existing relational data bases and equivalent means of capturing data. Such embodiments further enable the host user to compare one industrial plant to any number of other like plants to develop insights in an unconventional manner.

In a particular embodiment as disclosed herein, a computer-implemented method is provided for contextual data analysis and proactive intervention in industrial plant processes. Each of a plurality of data streams in an industrial plant is mapped to a common hierarchical data structure, wherein the data streams correspond to respective values or states generated in association with each of one or more unit operations, one or more assets, and one or more process streams in the industrial plant. The mapped data streams define hierarchical process relationships between subsets of the respective one or more unit operations, one or more assets, and one or more process streams. Real-time data is collected to populate at least one level of the hierarchical data structure for one or more of the plurality of data streams. At least one future outcome may be predicted for a downstream operation based on the collected real-time data for at least one data stream, and at least one other data stream having a defined hierarchical process relationship therewith. Upon ascertaining that the predicted future outcome corresponds to an issue requiring intervention, an output signal is generated based thereon.

In one exemplary aspect of the above-referenced embodiment, the mapped data streams may define hierarchical process relationships between subsets of the respective one or more unit operations, one or more assets, and one or more process streams are dynamically generated based on input from a graphical user interface generated on a display unit.

For example, the graphical user interface may comprise visual elements corresponding to respective unit operations, assets, or process streams, and tools enabling the selective arranging of the visual elements corresponding to their respective interactions there between, wherein one or more of the defined hierarchical process relationships are determined based on a spatial and/or temporal process flow between selectively arranged visual elements.

As a further example, the graphical user interface may enable data entry for one or more states and/or values associated with one or more of the selectively arranged visual elements, and one or more of the unit operations, asserts, or process streams for which data entry is available, and/or data limits or ranges for one or more of the unit operations, asserts, or process streams for which data entry is available, are dynamically determined based on the established relationships between the corresponding visual elements and others of the selectively arranged visual elements.

In another exemplary aspect of the above-referenced embodiment, as may likewise be combinable with other of the above-referenced aspects, the output signal may be generated to produce an audio and/or visual alert to an operator control panel associated with the required intervention.

In another exemplary aspect of the above-referenced embodiment, as may likewise be combinable with other of the above-referenced aspects, the output signal may be generated to a controller to direct the further generation of control signals to one or more actuators associated with the required intervention.

In another exemplary aspect of the above-referenced embodiment, as may likewise be combinable with other of the above-referenced aspects, real-time data may be inferred to virtually populate the at least one level of the hierarchical data structure for another one or more of the plurality of data streams, based on the collected real-time data for one or more data streams having a defined derivative relationship therewith. A future outcome for a downstream operation may accordingly be predicted based on the inferred real-time data for at least one of the other data streams, and at least one other data stream having a defined hierarchical process relationship therewith.

In another exemplary aspect of the above-referenced embodiment, as may likewise be combinable with other of the above-referenced aspects, feedback data may be provided for an upstream operation associated with another one or more of the plurality of data streams for which collected real-time data is unavailable, based on collected real-time data for one or more data streams having a defined hierarchical process relationship therewith. Upon ascertaining that the provided feedback data corresponds to an issue requiring intervention for the upstream operation, an output signal may further be generated based thereon.

In another exemplary aspect of the above-referenced embodiment, as may likewise be combinable with other of the above-referenced aspects, future ambient temperature data may be determined for at least a portion of the industrial plant. A future outcome may further be predicted for a downstream operation based on the collected real-time data for at least one data stream, at least one other data stream having a defined hierarchical process relationship therewith, and the determined future ambient temperature data.

In another exemplary aspect of the above-referenced embodiment, as may likewise be combinable with other of the above-referenced aspects, the common hierarchical data structure may be provided for each of at least a first industrial plant and a second industrial plant. Mapped data streams defining hierarchical process relationships in the at least first industrial plant may be compared with mapped data streams defining hierarchical process relationships in the least second industrial plant, wherein one or more process benchmarks may be generated for each of the at least first industrial plant and at least second industrial plant, based at least in part on collected real-time data from the one or more of the plurality of data streams associated with the at least first industrial plant and the at least second industrial plant.

It may further be ascertained that a predicted future outcome corresponds to an issue requiring intervention by comparing the predicted future outcome to one or more of the generated one or more process benchmarks.

In another exemplary aspect of the above-referenced embodiment, as may likewise be combinable with other of the above-referenced aspects, the common hierarchical data structure may be provided for each of at least a first industrial plant and a second industrial plant. Mapped data streams defining hierarchical process relationships in the at least first industrial plant may be compared with mapped data streams defining hierarchical process relationships in the least second industrial plant, wherein one or more performance models may be generated for a plurality of unit operations of a specified type at each of the at least first industrial plant and at least second industrial plant, based at least in part on one or more of the plurality of data streams associated with the at least first industrial plant and the at least second industrial plant. Collected real-time data from the unit operations of the specified type may be compared with the one or more performance models, wherein it may further be ascertained whether a performance of at least one unit operation of the specified type corresponds to an issue requiring intervention.

In another embodiment as disclosed herein, a system may be provided with at least one server in functional association with a data storage network and a communications network. The server is configured for bilateral data communication with respective local controllers at each of a plurality of industrial plants via the communications network, and with one or more user computing devices configured to generate a graphical user interface on a display unit thereof. The server is further configured, for each respective one of the plurality of industrial plants, to implement a method in accordance with the above-referenced embodiment and associated exemplary aspects.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
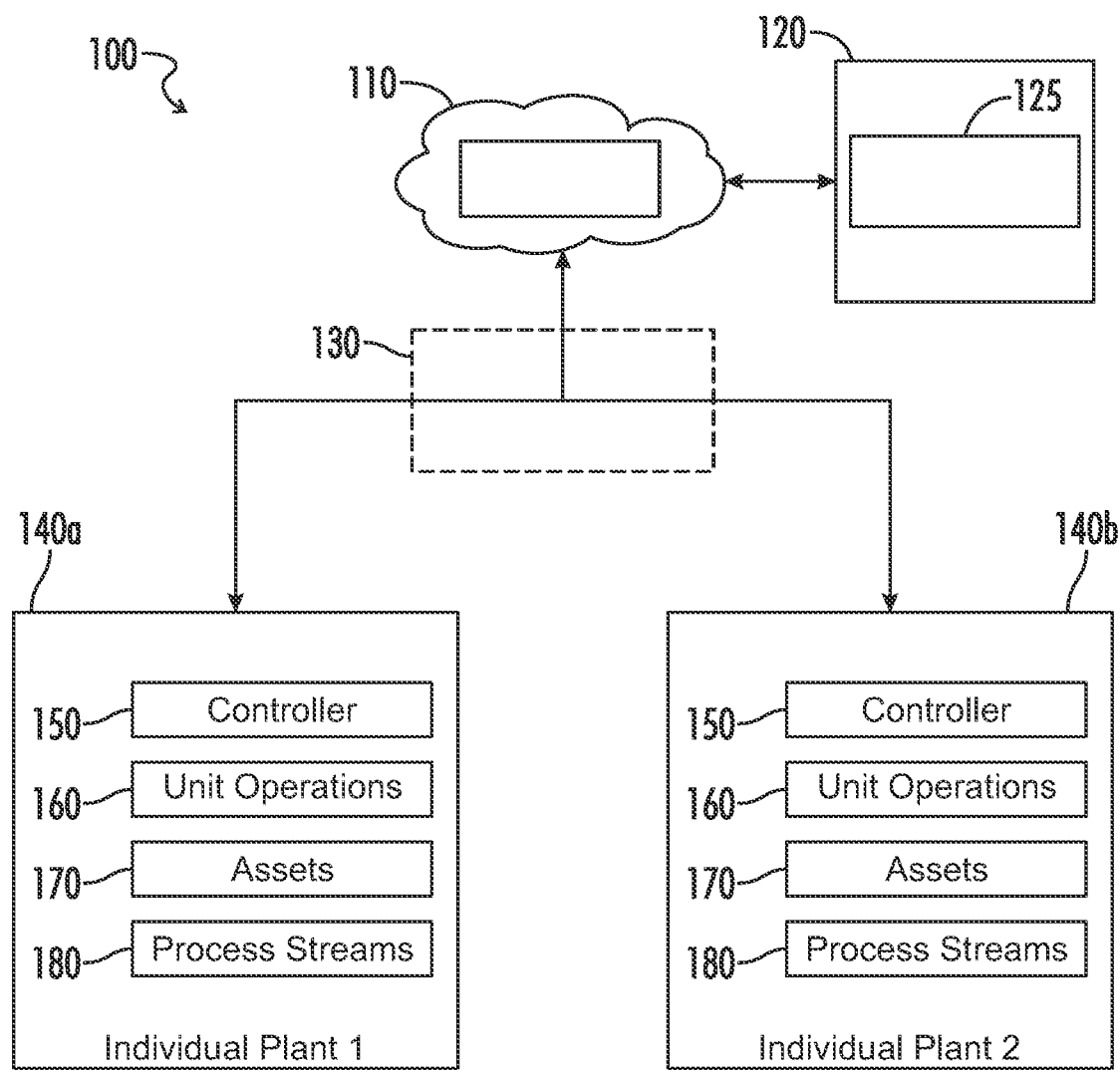
FIG. 1 is block diagram representing an embodiment of a system as disclosed herein.
Figure 2:
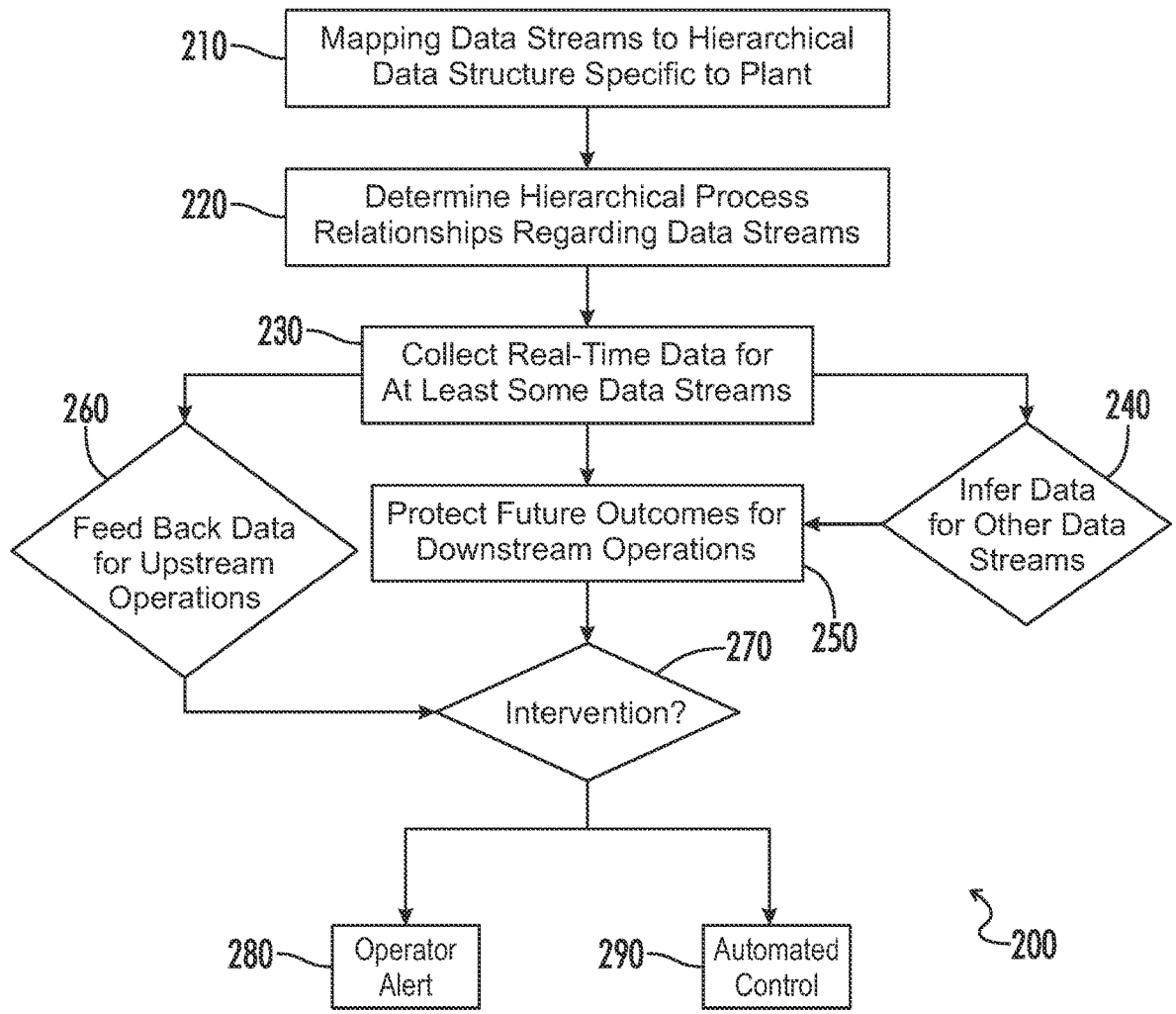
FIG. 2 is a flowchart representing an exemplary method of operation according to an embodiment of the present disclosure.
Figure 3:
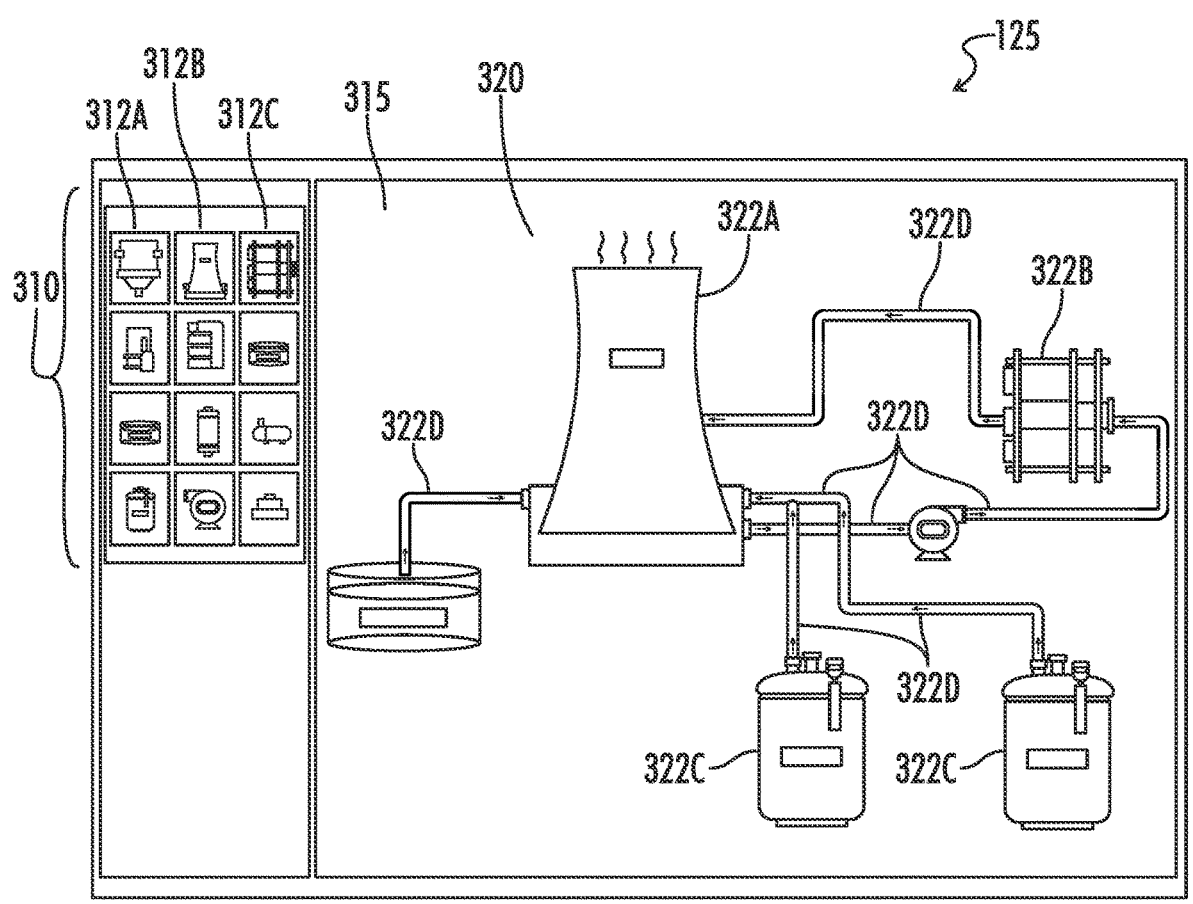
FIG. 3 is a graphical representation of a user interface with associated tools for defining hierarchical relationships between selected items according to a system and method of the present disclosure.

Referring generally to FIGS. 1-3, various exemplary embodiments of an invention may now be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Referring first to FIG. 1, an embodiment of a cloud-based system 100 as disclosed herein may be provided with respect to each of one or more industrial plants 140 associated with the system, or otherwise for example having products and/or services supplied by a hosted system. The term "industrial plant" as used herein may generally connote a facility for production of goods, independently or as part of a group of such facilities, and may for example involve an industrial process and chemical business, a manufacturing industry, food and beverage industry, agricultural industry, swimming pool industry, home automation industry, leather treatment industry, paper making process, and the like.

The illustrated system 100 according to FIG. 1 refers to a cloud-based server 110 further functionally linked to at least one user computing device 120 having a display unit 125 for implementing a graphical user interface as further described herein. In alternative embodiments, it may be that the system is locally implemented with respect to an industrial plant 140, wherein the cloud-based aspects are omitted. The user computing device 120 may in further alternative embodiments be functionally linked to the industrial plants 140 via the communications network 130 and configured to act as the server 110 for the purpose of data collection and processing as disclosed herein.

Each industrial plant 140 as shown in FIG. 1 as including a local controller 150 which may be functionally linked to the server 110 via the communications network 130. The controller 150 may be configured for example to direct the collection and transmittal of data from the industrial plant 140 to the cloud server 110, and further to direct output signals from the server to other process controllers at the plant level or more directly to process actuators in the form of control signals to implement automated interventions. In some embodiments the controller 150 may be omitted, where for example data collection tools are distributed to directly transmit data streams via the communications network 130, and the user computing device 120 is implemented to receive the output signals from the server 110, etc. In some embodiments, the controller 150 may be comprised of at least part of an industrial plant's resident control system.

A data collection stage (not shown) may be provided into the system 100 to provide real time sensing or measurements of states and/or values for various data streams associated with unit operations 160, simple assets 170, and/or process streams 180 associated with a given industrial plant 140. The term "unit operations" as used herein may generally relate to, e.g., cooling towers, heat exchangers, boilers, Brown stock washers, and the like, merely for illustrative purposes and without limiting the scope of the term beyond what would otherwise be readily understood by one of skill in the art. The term "assets" as used herein may generally relate to, e.g., chemical tanks, storage facilities, and the like, again merely for illustrative purposes and without limiting the scope of the term beyond what would otherwise be readily understood by one of skill in the art. The term "process streams" as used herein may generally relate to, e.g., interconnecting channels of water, energy, material (e.g., fiber), and the like between other elements, yet again merely for illustrative purposes and without limiting the scope of the term beyond what would otherwise be readily understood by one of skill in the art. It should further be understood that examples used herein for one of the above terms (e.g., unit operations) may also or otherwise be implemented as another of the above terms (e.g., assets), depending for example on the manner of implementation or simple user preference.

One or more online sensors may for example be configured to provide substantially continuous and wireless signals representative of values or states. The term "sensors" may include, without limitation, physical level sensors, relays, and equivalent monitoring devices as may be provided to directly measure values or states, or to measure appropriate derivative values from which such values or states may be measured or calculated, as well as user interface components for data entry. The term "online" as used herein may generally refer to the use of a device, sensor, or corresponding elements proximally located to a container, machine or associated process elements, and generating output signals in real time corresponding to the desired process characteristics, as distinguished from manual or automated sample collection and "offline" analysis in a laboratory or through visual observation by one or more operators.

Individual data collectors may be implemented for respective data streams, or in some embodiments one or more individual data collectors may provide respective output signals that are implemented for the calculation of values or states for multiple data streams. Individual data collectors may be separately mounted and configured, or the system 100 may provide a modular housing which includes, e.g., a plurality of sensors or sensing elements. Sensors or sensor elements may be mounted permanently or portably in a particular location respective to the production stage, or may be dynamically adjustable in position so as to collect data from a plurality of locations during operation.

One or more additional data collectors may provide substantially continuous measurements with respect to various controlled process characteristics. The term "continuous" as used herein, at least with respect to the disclosed sensor outputs, does not require an explicit degree of continuity, but rather may generally describe a series of measurements corresponding to physical and technological capabilities of the sensors, the physical and technological capabilities of the transmission media, the physical and technological capabilities of any intervening local controller and/or interface configured to receive the sensor output signals, etc. For example, measurements may be taken and provided periodically and at a rate slower than the maximum possible rate based on the relevant hardware components, or based on a communications network 106 configuration which smooths out input values over time, and still be considered "continuous."

The data collection stage of the exemplary system 100 as disclosed herein may comprise more than just streaming sensors, gauges, meters, relays, and associated measurements or derivative calculations, and may further include manual data streams such as for example provided by users in a spreadsheet or the like, customer relationship management (CRM) data streams, and external data streams such as for example digital control system (DCS) information from the industrial plants, third party weather information, and the like.

Each of one or more fixed or mobile user interfaces 125 may be provided and configured to display process information and/or to enable user input regarding aspects of the system and method as disclosed herein. For example, a user may be able to selectively monitor process characteristics in real-time, and also selectively modify system elements which for example represent a customer's process configuration and thereby establish hierarchical data relationships between the data streams associated with certain system elements. The term "user interface" as used herein may unless otherwise stated include any input-output module with respect to the hosted data server including but not limited to: a stationary operator panel with keyed data entry, touch screen, buttons, dials or the like; web portals, such as individual web pages or those collectively defining a hosted website; mobile device applications, and the like. Accordingly, one example of the user interface may be as generated remotely on a mobile user computing device and communicatively linked to the remote server 110. Alternatively, an example of the user interface may within the scope of the present disclosure be generated on a stationary display unit in an operator control panel associated with the production stage of an industrial plant.

The data from the data collection stage, for example outputs from level sensors, corresponding to one or more data streams may be provided to the server 110 via a communications network 130 via one or more network interface devices such as for example a wireless modem. In some embodiments, the local controller 150 may be implemented and configured to directly receive the aforementioned signals and perform specified data processing and control functions, while separately corresponding with the remote server 110 (cloud-based computing network) via the communications network 130 including a communications device. Each level sensor data stream, for example, may be connected by a hard wired connection or a wireless link to the local controller wherein identifying information associated with each data stream (e.g., a particular bulk container or product) may be further received by the remote server.

In an embodiment (not shown), a conversion stage may be added for the purpose of converting raw signals from one or more of the online data collectors to a signal compatible with data transmission or data processing protocols of the communications network and/or cloud server-based storage and applications. A conversion stage may relate not only to input requirements but also may further be provided for data security between one or more sensors and the server, or between local computing devices such as a controller and the server.

The term "communications network" as used herein with respect to data communication between two or more system components or otherwise between communications network interfaces associated with two or more system components may refer to any one of, or a combination of any two or more of, telecommunications networks (whether wired, wireless, cellular or the like), a global network such as the Internet, local networks, network links, Internet Service Providers (ISP's), and intermediate communication interfaces. Any one or more recognized interface standards may be implemented therewith, including but not limited to Bluetooth, RF, Ethernet, and the like.

In an embodiment, the remote server 110 may further include or be communicatively linked to a proprietary cloud-based data storage. The data storage may for example be configured to obtain, process and aggregate/store data for the purpose of developing correlations over time, improving upon existing linear regressions or other relevant iterative algorithms, etc.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring next to FIG. 2, one particular embodiment of a method 200 for operating a system 100 such as that illustrated in FIG. 1 may be described in more detail. Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

For a given industrial plant 140*a*, the method 200 of the present embodiment begins by mapping each of a plurality of data streams in an industrial plant to a common hierarchical data structure, wherein the data streams correspond to respective values or states generated in association with each of one or more unit operations 160, one or more assets 170, and one or more process streams 180 in the industrial plant 140*a* (step 210). The mapped data streams may further define hierarchical process relationships between subsets of the respective unit operations, assets, and/or process streams (step 220).

Generally stated, the method 200 implements a structured approach to collecting data in an industrial plant that gives the same framework and structure to all data at the site in order to definitely establish their relationship relative to each other. In one embodiment, the structure may be defined in layers as including: {customer/entity}; {location}; {process (and sub-process, sub-sub-process, etc.)}; asset (and sub-asset, sub-sub-asset, etc.)}; {device/data source}.

In one example, the establishment of hierarchical process relationships and the associated contextual links in the context of a core data structure can be provided dynamically using user interface tools 310 as illustrated in FIG. 3. A user may be provided with graphical icons 312A, 312B, 312C . . . 312*x* to create a process flow diagram 320 associated with the industrial plant 140*a*, for example by 'dragging and dropping' icons 312 from dedicated tiles 310 on the left side of the screen into a primary window 315 and then appropriately linking the represented process elements 322. The graphical icons 312 can represent, e.g., unit operations (e.g., cooling towers 322A, heat exchangers 322B, boilers 322C, Brown stock washers, etc.), process streams 322D, or simple assets (e.g., chemical tanks, storage facilities, etc.). Every icon in the process flow diagram 320 may also have selectable and specific data fields that describe the mechanical, operational, chemical (or other) parameters associated with that icon. Additional data inputs can be added by provisioning a streaming sensor or a manual data entry point to the icon. The data from these can be added to further enrich the data content associated with each icon. Lines, representing streams 322D, may further connect various icons, wherein the flow of water, energy, fiber or other components can be described in the graphical interface. The contextual view then can be used to carry out various advanced calculations to generate unique insights.

In an embodiment, certain hierarchical process relationships may be determined based not only on a spatial representation but also on temporal process flow defined between selectively arranged visual elements. For example, the graphically arranged elements may allow for the selection of locations and directional identifiers to establish the hierarchical process flow between the visual elements, and additional parameters associated with the visual elements may further describe, or enable determination of, a temporal distinction between a condition at a first (upstream) point in the process and the same condition at a second (downstream) point in the process.

By fully comprehending where each data stream resides in the context of the process flow, the system can proactively consider the impacts of multiple inputs at a particular downstream unit operation. Adjustments to one or more such inputs can address undesirable lags in control response which might occur, and can further even enable automated feed-forward control for overall process optimization which would otherwise never be contemplated in a real-time threshold based system, for example in the context of adjustments to an upstream portion of the process which is operating within specifications, further in view of the downstream portion of the process which is also currently operating within specifications.

One of skill in the art may appreciate from a graphical representation as disclosed herein where, e.g., a cooling tower is getting its make-up water from, or that the output of a brown stock washer is going to a specific bleaching plant. These determinations may further enable the prediction of an output or performance of a unit operation based on the knowledge of what is happening in the preceding unit operation, and in the still further preceding unit operation, etc. As but one example, a measured process stream is identified as feeding into a cooling tower in a recycle scenario. If either or both of the quality of the process water or the available rate of this stream change suddenly, a system and method as disclosed herein can simulate what will happen at the cooling tower and take preventive action. If the hardness suddenly increases in the feeding stream, one example of a desired automatic intervention may be to add more dispersant, or add acid to the cooling tower to minimize issues from scaling of heat exchangers. In other words, it is advantageous to connect the performance of a cooling tower to not only the stream that is feeding it, but whatever operating parameters are impacting the stream before it, etc.

In an embodiment, the system may perform a steady-state analysis of a graphically represented hierarchical data process, and further determine if the selected arrangement is appropriate or otherwise incompatible with baseline rules for process configuration. In another embodiment, the system may further perform an analysis of the process configuration relative to historical configurations, or configurations associated with other industrial plants, for example to enable benchmarking techniques as further discussed herein.

As previously noted, real-time data is collected for at least some of the mapped data streams, via a data collection stage including for example level sensors and the like (step 230), and the method 200 continues with the prediction of future outcomes for downstream operations, based for example on the collected real-time data for at least one data stream, and at least one other data stream having a defined hierarchical process relationship therewith (step 250). In an embodiment, the server 110 may further obtain future ambient temperature data for at least a portion of the industrial plant, wherein the future outcome for a downstream operation may further be predicted based on the collected real-time data for at least one data stream, at least one other data stream having a defined hierarchical process relationship therewith, and the determined future ambient temperature data. For example, knowing that a certain condition is present at a downstream operation may serve as one indication regarding the future condition at an upstream operation, based on the hierarchical data relationships there between, but the future condition at the upstream condition is also known to be impacted by changes in the local temperature or other measurable and predictably forecast ambient conditions. In that case, the server can improve upon the prediction in step 250 by implementing such forecast changes. In some embodiments, the server may only implement forecast changes above a certain threshold (e.g., heat above a threshold temperature, or below a threshold temperature, or changes in heat above a threshold delta value, etc.), or may further determine and weigh a reliability of the forecast.

In one optional variant on the present embodiment, contextual links as provided in the above-referenced steps can further enable the inference of real-time data for other data streams lacking corresponding real-time data collection, based for example on the collected real-time data for one or more data streams having a defined derivative relationship therewith (step 240). In this case, future outcomes may likewise be predicted for a downstream operation (step 250) based on the inferred real-time data for at least one of the data streams lacking real-time data collection in an 'actual' sense, and at least one other data stream having a defined hierarchical process relationship therewith.

Having predicted future outcomes, the exemplary method 200 continues by ascertaining whether a predicted future outcome corresponds to an issue requiring intervention (step 270).

Contextual links as provided herein may optionally enable feedback data, from collected real-time data associated with a downstream operation, to data streams having a defined hierarchical (i.e., upstream) process relationship therewith and otherwise lacking real-time data collection (step 250). In this context, the method 200 also continues by ascertaining whether the provided feedback data corresponds to an issue requiring intervention for the upstream operation (step 270).

Upon determining that intervention is required, or at least desirable, for an ascertained issue in the process, the method 200 may continue by generating an output signal therefor. In one example, an output signal may be generated to an operator control panel, user interface, or other alternative audio/visual indicators for the purpose of providing an alert, alarm, message, or the like (step 280). In this example, an operator may be given the opportunity to manually implement the prompted intervention, implement a different intervention relating to the issue, or for example to even disregard the intervention. In another example, an output signal may be generated to an internal controller 150 or other process control system for the purpose of implementing automated control of one or more process actuators or like elements to address the issue. Control signals may for example drive electro-mechanical actuators, switches, flow valves, hydraulic piston-cylinder arrangements, as illustrative examples but otherwise without limitation thereto.

In an embodiment, users can benchmark the performance of process elements such as for example a unit operation at one industrial plant 140a against at least one other industrial plant 140b which has similar mechanical-operational-chemical attributes. This type of benchmarking allows one to very quickly assess the performance gaps and take corrective action.

In an embodiment, a common hierarchical data structure may be provided for each of the industrial plants 140a, 140b, wherein the server 110 may be configured to compare mapped data streams defining hierarchical process relationships in the first industrial plant 140a with mapped data streams defining hierarchical process relationships in the second industrial plant 140b. The server 110 may further generate one or more process benchmarks, based at least in part on collected real-time data from certain data streams associated with each of the industrial plants. The server 100 may still further ascertain that a predicted future outcome corresponds to an issue requiring intervention by comparing the predicted future outcome to one or more of the generated process benchmarks.

In an embodiment, a number of unit operations 160 may be identified in multiple different industrial plants 140a, 140b which have all been defined with the same hierarchical data framework. Collected data from these unit operations over time may accordingly be used to calculate a performance model for a specified type of unit operation, wherein subsequent actual results may be compared to expected results corresponding to the performance model, and corrective interventions may be prompted or automatically implemented as needed. As one illustrative example, one hundred cooling towers have been defined with the same hierarchical data structure (e.g., customer-location-system-asset-device, etc.). These cooling towers all have been defined with a unit operation type (e.g., open recirculating cooling water), with a defined hierarchy of audit data (mechanical-operational-chemical, or "MOC") and each of the cooling towers have associated corrosion sensors. The corrosion rate information from the individual cooling towers, along with the MOC data, aggregated in the cloud, may be used to generate a performance model that demonstrates the corrosion inhibition performance of any implemented chemistry under a given MOC condition. This performance model may be continuously updated in the cloud and used to, e.g., detect faulty sensors for replacement at an individual industrial plant, detect water upsets necessitating corrective action, and the like.

One of skill in the art may further appreciate the potential use of flow sheet simulators to conduct a water, energy and material balance of an industrial system. When data from sensors or manual data is "provisioned" on an icon or a stream, that data can be used to predict problems long before they actually create harm. For example, if one associates a calcium sensor to a cooling water make-up stream, and if the calcium level were to suddenly increase, a steady state simulation in the cloud can detect that the system will foul in roughly twenty-four hours. This insight can be used to take proactive action to feed more chemistry or change the make-up water source, potentially avoiding substantial monetary impacts from lost heat exchange or downtime from having to clean the exchanger. This combination of steady-state simulation and real-time sensing may be a particularly advantageous result of such embodiments as disclosed herein.

Generally stated, contextual data as enabled by a system and method as disclosed herein provides insights that are otherwise unavailable. For example, a chemical tank may contain a corrosion inhibitor, fitted with a level sensor and a pump provisioned to the tank, and feeding into a stream. A corrosion sensor is provisioned to the stream. A system as disclosed herein may be configured to monitor the pump "on time" data, the level sensor data, and the corrosion rate data, wherein a number of unambiguous determinations may be subsequently made, e.g., whether the pump is air-licked, whether the corrosion sensor is working, whether the tank has run out of the corrosion inhibitor, etc. The system can further remotely calibrate the pumping rate using level sensor data, etc.

In an embodiment, data aggregation may be implemented in the cloud server 110 for an individual industrial plant 140, further with respect to known hierarchical data relationships between the various data streams as disclosed herein, to make cloud-based (host-level) decisions for process optimization at the plant. For example, biocidal chemistries may be used for cleaning of process vessels (e.g., milk pasteurization vessels) in between runs, with the waste stream for this process often being routed to a biological waste treatment plant. The presence of high concentrations of biocide, however, can kill certain microorganisms in the biological plant and this can further cause the effluent from the biological plant to violate discharge limits. With a sensor provided to measure flow or pH of the waste stream from the process in substantially real-time, the system may use this information and knowledge of where this stream is next headed to separate the process waste stream into a holding tank and more incrementally supply it into the process over a period of time, thus ensuring that the bacteria are not overwhelmed all at once.

Such advantages may be realized in any situation where, given known hierarchical data relationships as disclosed herein and the collected real-time data from the upstream data source, the consequences to a downstream unit operation can be predicted and improved.

Additional advantages in such scenarios may be realized in that communication may be effectively enabled between unit operations without the need for, e.g., local wireless transducers, thereby eliminating at least one source of additional cost and notorious unreliability from the system.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A computer-implemented method for contextual data analysis and proactive intervention in industrial plant processes, the method comprising:
   generating a graphical user interface on a display unit, the graphical user interface comprising
   visual elements corresponding to respective unit operations, assets, or process streams, and tools enabling the selective arranging of the visual elements corresponding to their respective interactions there between;
based at least in part on input received via the graphical user interface, mapping each of a plurality of data streams in an industrial plant to a common hierarchical data structure,
wherein the data streams correspond to respective values or states generated in association with each of one or more unit operations, one or more assets, and one or more process streams in the industrial plant,
wherein the mapped data streams define hierarchical process relationships between subsets of the respective one or more unit operations, one or more assets, and one or more process streams, and
wherein one or more of the defined hierarchical process relationships are determined based on a spatial and/or temporal process flow between selectively arranged visual elements;
collecting real-time data to populate at least one level of the hierarchical data structure for one or more of the plurality of data streams;
predicting a future outcome for a downstream operation in the process flow based on the collected real-time data for at least one data stream, and at least one other data stream having a defined hierarchical process relationship therewith; and
upon ascertaining that the predicted future outcome corresponds to an issue requiring intervention, generating an output signal based thereon.

2. The computer-implemented method of claim 1, wherein:
the graphical user interface further enables data entry for one or more states and/or values associated with one or more of the selectively arranged visual elements, and
one or more of the unit operations, asserts, or process streams for which data entry is available, and/or data limits or ranges for one or more of the unit operations, asserts, or process streams for which data entry is available, are dynamically determined based on the established relationships between the corresponding visual elements and others of the selectively arranged visual elements.

3. The computer-implemented method of claim 1, wherein:
the output signal is generated to produce an audio and/or visual alert to an operator control panel associated with the required intervention.

4. The computer-implemented method of claim 1, wherein:
the output signal is generated to a controller to direct the further generation of control signals to one or more actuators associated with the required intervention.

5. The computer-implemented method of claim 1, further comprising:
inferring real-time data to virtually populate the at least one level of the hierarchical data structure for another one or more of the plurality of data streams, based on the collected real-time data for one or more data streams having a defined derivative relationship therewith; and
predicting a future outcome for a downstream operation based on the inferred real-time data for at least one of the another one or more data streams, and at least one other data stream having a defined hierarchical process relationship therewith.

6. The computer-implemented method of claim 1, further comprising:
providing feedback data for an upstream operation associated with another one or more of the plurality of data streams for which collected real-time data is unavailable, based on collected real-time data for one or more data streams having a defined hierarchical process relationship therewith; and
upon ascertaining that the provided feedback data corresponds to an issue requiring intervention for the upstream operation, generating an output signal based thereon.

7. The computer-implemented method of claim 1, further comprising:
determining future ambient temperature data for at least a portion of the industrial plant; and
predicting a future outcome for a downstream operation based on the collected real-time data for at least one data stream, at least one other data stream having a defined hierarchical process relationship therewith, and the determined future ambient temperature data.

8. The computer-implemented method of claim 1, further comprising:
providing the common hierarchical data structure for each of at least a first industrial plant and a second industrial plant;
comparing mapped data streams defining hierarchical process relationships in the at least first industrial plant with mapped data streams defining hierarchical process relationships in the least second industrial plant;
generating one or more process benchmarks for each of the at least first industrial plant and at least second industrial plant, based at least in part on collected real-time data from the one or more of the plurality of data streams associated with the at least first industrial plant and the at least second industrial plant; and
ascertaining that a predicted future outcome corresponds to an issue requiring intervention by comparing the predicted future outcome to one or more of the generated one or more process benchmarks.

9. The computer-implemented method of claim 1, further comprising:
providing the common hierarchical data structure for each of at least a first industrial plant and a second industrial plant;
comparing mapped data streams defining hierarchical process relationships in the at least first industrial plant with mapped data streams defining hierarchical process relationships in the least second industrial plant;
generating one or more performance models for a plurality of unit operations of a specified type at each of the at least first industrial plant and at least second industrial plant, based at least in part on one or more of the plurality of data streams associated with the at least first industrial plant and the at least second industrial plant;
comparing collected real-time data from the unit operations of the specified type with the one or more performance models; and
ascertaining that a performance of at least one unit operation of the specified type corresponds to an issue requiring intervention.

10. A system comprising:
at least one central computing device in functional association with a data storage network and a communications network, and configured for bilateral data communication with respective local controllers at each of a plurality of industrial plants via the communications network, and with one or more distributed user computing devices respectively configured to generate a graphical user interface on a display unit thereof, wherein the at least one central computing device is configured to direct the performance of, for each respective one of the plurality of industrial plants:

selectively generating the graphical user interface comprising visual elements corresponding to respective unit operations, assets, or process streams, and further comprising tools enabling the selective arranging of the visual elements corresponding to their respective interactions there between;

based at least in part on input received via the graphical user interface, mapping each of a plurality of data streams in the industrial plant to a common hierarchical data structure, wherein the data streams correspond to respective values or states generated in association with each of one or more unit operations, one or more assets, and one or more process streams in the industrial plant, wherein the mapped data streams define hierarchical process relationships between subsets of the respective one or more unit operations, one or more assets, and one or more process streams, and wherein one or more of the defined hierarchical process relationships are determined based on a spatial and/or temporal process flow between the selectively arranged visual elements;

collecting real-time data to populate at least one level of the hierarchical data structure for one or more of the plurality of data streams;

predicting a future outcome for a downstream operation in the process flow based on the collected real-time data for at least one data stream, and at least one other data stream having a defined hierarchical process relationship therewith; and upon ascertaining that the predicted future outcome corresponds to an issue requiring intervention, generating an output signal based thereon.

11. The system of claim 10, wherein:

the graphical user interface further enables data entry for one or more states and/or values associated with one or more of the selectively arranged visual elements, and one or more of the unit operations, asserts, or process streams for which data entry is available, and/or data limits or ranges for one or more of the unit operations, asserts, or process streams for which data entry is available, are dynamically determined based on the established relationships between the corresponding visual elements and others of the selectively arranged visual elements.

12. The system of claim 10, wherein:

the output signal is generated to produce an audio and/or visual alert to an operator control panel associated with the required intervention.

13. The system of claim 10, wherein:

the output signal is generated to the controller to direct the further generation of control signals to one or more actuators associated with the required intervention.

14. The system of claim 10, wherein the at least one central computing device is further configured to:

infer real-time data to virtually populate the at least one level of the hierarchical data structure for another one or more of the plurality of data streams, based on the collected real-time data for one or more data streams having a defined derivative relationship therewith; and predict a future outcome for a downstream operation based on the inferred real-time data for at least one of the another one or more data streams, and at least one other data stream having a defined hierarchical process relationship therewith.

15. The system of claim 10, wherein the at least one central computing device is further configured to:

provide feedback data for an upstream operation associated with another one or more of the plurality of data streams for which collected real-time data is unavailable, based on collected real-time data for one or more data streams having a defined hierarchical process relationship therewith; and upon ascertaining that the provided feedback data corresponds to an issue requiring intervention for the upstream operation, generate an output signal based thereon.

16. The system of claim 10, wherein the at least one central computing device is further configured to:

determine future ambient temperature data for at least a portion of the industrial plant; and predict a future outcome for a downstream operation based on the collected real-time data for at least one data stream, at least one other data stream having a defined hierarchical process relationship therewith, and the determined future ambient temperature data.

\* \* \* \* \*